Porter & Roberts.
Potato-Washer.

N° 74420.                    Patented Feb. 11, 1868.

Witnesses.
E. D. Matthews
J. L. Buck.

Inventors.
E. N. Porter & P. S. Roberts
By their Atty
J. F. Reigart

United States Patent Office.

E. N. PORTER AND P. P. ROBERTS, OF MORRISVILLE, VERMONT.

Letters Patent No. 74,420, dated February 11, 1868.

IMPROVED POTATO-WASHER.

*The Schedule referred to in these Letters Patent and making part of the same.*

TO ALL WHOM IT MAY CONCERN:

Be it known that we, E. N. PORTER and P. P. ROBERTS, of Morrisville, Lamoille county, State of Vermont, have invented an Improved Potato-Washer; and we do hereby declare the following to be an exact description of the same, reference being had to the accompanying drawings, and to the letters of reference marked thereon, making a part of this specification, in which—

Figure 1:
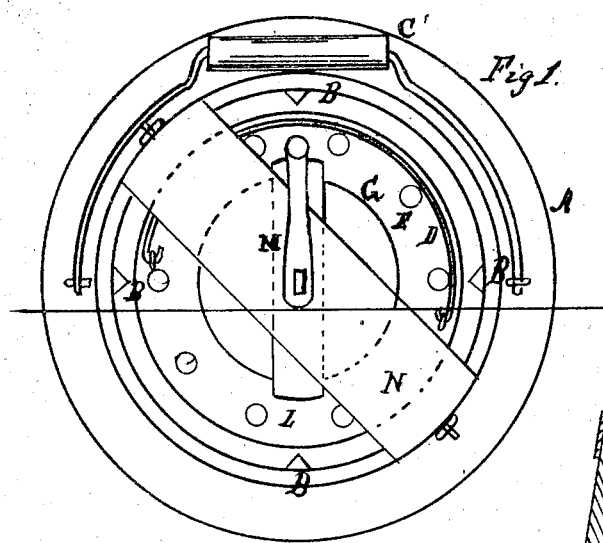

Figure 1 represents a top view of the washer.

Figure 2:
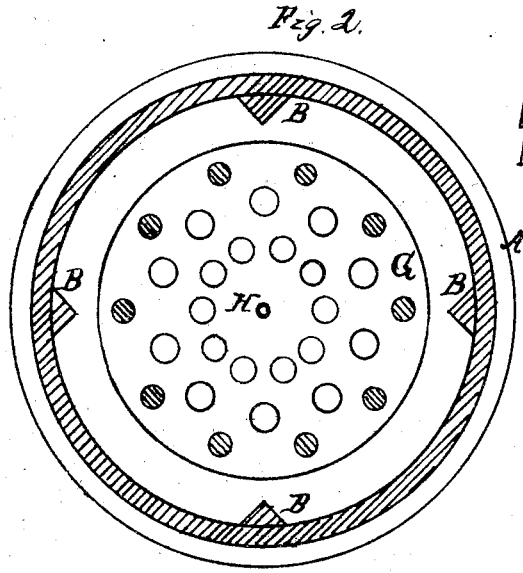

Figure 2, an inside view of the bottom, with its perforations.

Figure 3:
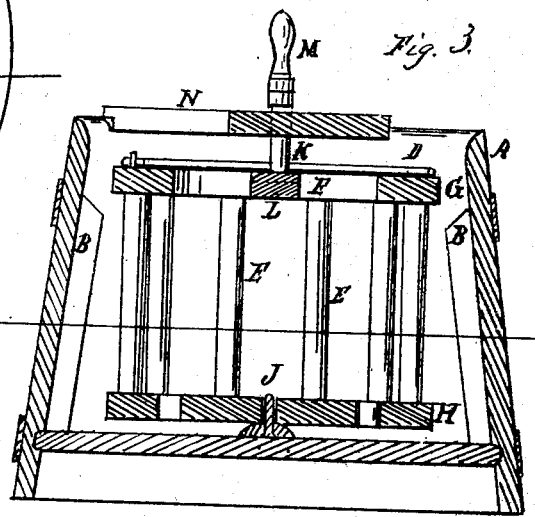

Figure 3, a vertical section of the washer.

The nature of our invention consists in the construction of the vertical potato-washer, rotating in a pail, with flanges on the inside of the pail.

A represents the pail, with its flanges, B B, on the inside, that causes the water to be dashed in and upon the potatoes, to wash them thoroughly. C is a handle to the pail. D is a handle to the washer, to lift it in or out of the pail. E is a cylindrical washer formed of round posts, attached to a rim, G, at top, and to a perforated bottom, H, beneath, the bottom resting upon a pivot, J, in the centre, upon which the washer is rotated. A spindle, K, at top, is attached to a cross-brace, L, that rests in the rim G, and is movable, when the potatoes are put in or taken out of the washer. A crank, M, operates the spindle K, to rotate the washer. A cross-brace, N, at top of the pail A, holds the spindle K in its central position.

What we claim as our invention, and desire to secure by Letters Patent, is—

The vertical potato-washer E rotating in a pail with flanges B on the inside, when constructed and combined as herein described and for the purposes set forth.

E. N. PORTER,
P. P. ROBERTS.

Witnesses:
E. J. PIERSON,
T. A. DOTY.